Feb. 16, 1926.
C. BRIGNOLO ET AL
1,573,672
BUMPER
Filed Oct. 13, 1925    2 Sheets-Sheet 1
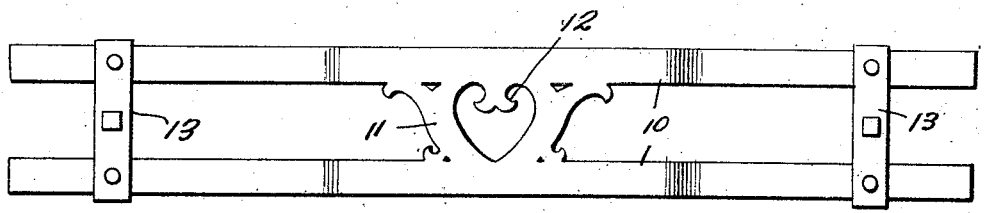
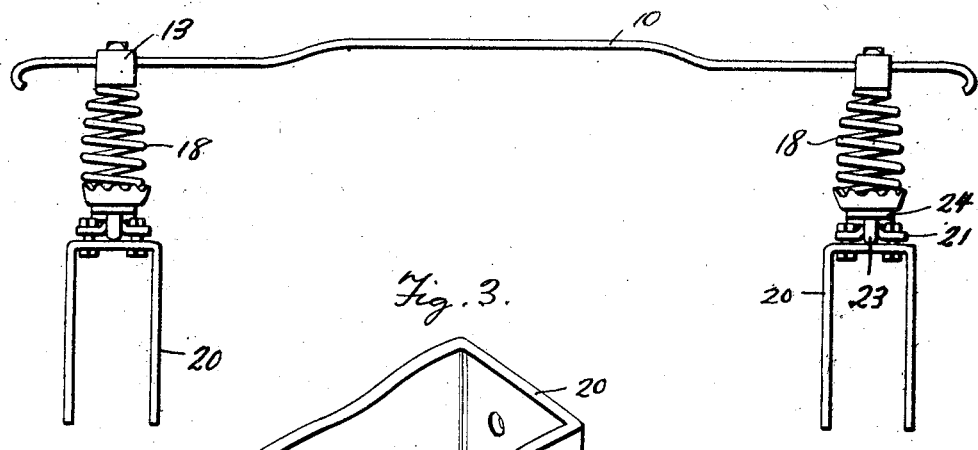
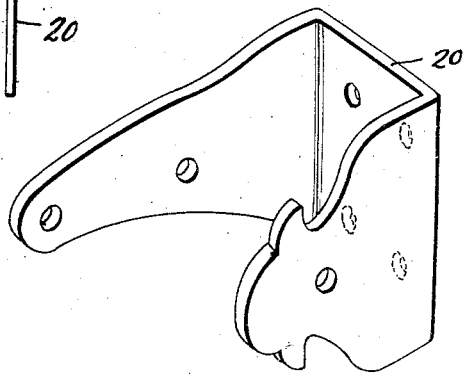

Feb. 16, 1926.  
C. BRIGNOLO ET AL  
1,573,672  
BUMPER  
Filed Oct. 13, 1925   2 Sheets-Sheet 2
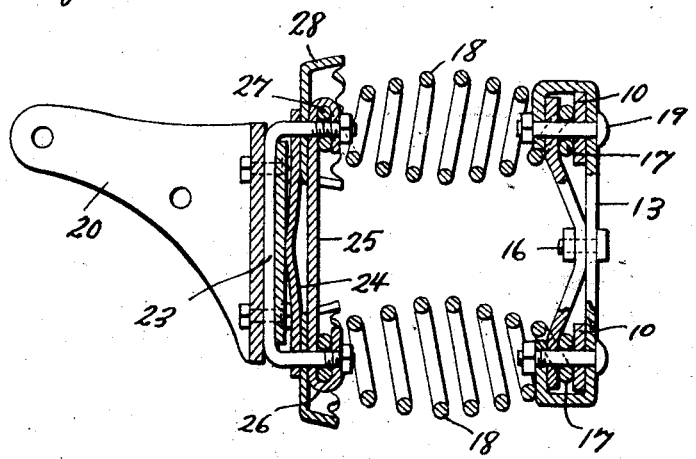
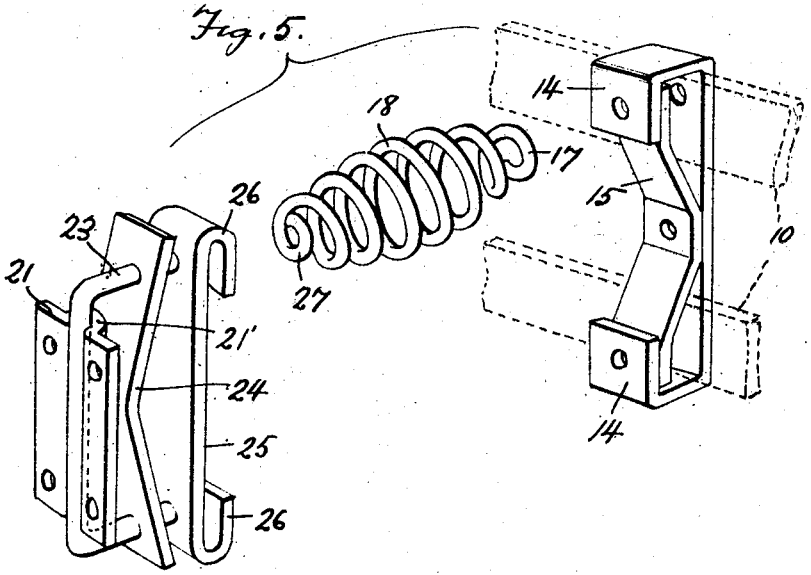
Cyrill Brignolo,
Thony Amari,
Giuseppe Brignolo, INVENTORS
BY Victor J. Evans
ATTORNEY
WITNESS: Gerald Hennesy Patented Feb. 16, 1926.

1,573,672

UNITED STATES PATENT OFFICE.

CYRILL BRIGNOLO, THONY AMARI, AND GIUSEPPE BRIGNOLO, OF EAST BOSTON, MASSACHUSETTS.

BUMPER.

Application filed October 13, 1925. Serial No. 62,282.

*To all whom it may concern:*

Be it known that we, CYRILL BRIGNOLO, THONY AMARI, and GIUSEPPE BRIGNOLO, citizens of the United States, residing at East Boston, in the county of Suffolk and State of Massachusetts, have invented new and useful Improvements in Bumpers, of which the following is a specification.

This invention relates to improvements in bumpers, the general object being to provide a resilient supporting means for the bumper upon the hanger bracket upon the motor vehicle chassis whereby a resilient universal support may be had for the bumper which will give in any direction when striking an object and yet being limited as to its resilient forces and give the desired effect as a bumper and yet absorb the usual shock experienced in striking an object.

Another object of our invention resides in the construction of parts and the arrangements thereof in the support of the bumper whereby the resilient supporting means may be rigidly secured to the bumper and to the hanger support upon the motor vehicle chassis to which the present invention is applied.

With the above and other objects in view, the invention further includes the following novel features and details of construction, to be hereinafter more fully described, illustrated in the accompanying drawings and pointed out in the appended claims.

In the drawings:—

Figure 1 is a front elevation of our bumper.

Figure 2 is a top plan view thereof with the associated and supporting means included thereon.

Figure 3 is a perspective of one of the hanger brackets.

Figure 4 is a fragmentary side elevation of one of the hanger brackets illustrating the manner in which the resilient supporting means is connected thereto and with the bumper.

Figure 5 is a perspective of the elements forming our invention.

Referring to the drawings in detail, wherein like characters of reference denote corresponding parts, the reference character 10 indicates a pair of spaced parallel bars, auxiliary strips 11 formed integral upon the inner meeting edges thereof in forming an ornamental design 12 therebetween and centrally of the length of the bumper as completed. The opposite end portions of the bars 10 forming the bumper are positioned upon the inner side of plates 13 having inwardly extending apertured ears 14 provided upon the respective ends thereof thus forming the enclosure for the reception of the bars 10 forming the bumper and immediately behind the respective end of a spring plate 15 secured as at 16 intermediate the length of the plate 13. The forward end convolutions 17 of coiled springs 18 encircles portions of bolts 19 extending through the respective end of the plates 13 and corresponding end of the spring plate 15 and the apertured ears 14 in securing the forward convolutions 17 of the springs 18 rigidly thereto in the support of the bumper, as completed, upon the forward ends of the springs 18.

In order to provide means for supporting the opposite ends of the springs 18 upon a motor vehicle chassis, not shown, we provide hanger brackets 20 supporting plates 21 upon the forward side which in turn includes vertically disposed channel portions 21' upon their inner sides against the forward side of the plates 21 for the reception of the intermediate portions of U-bolts 23 therein, also including an offset spring plate 24 thereon immediately behind the plate 25 terminating in inwardly extending apertured ears 26. The adjacent end spring convolutions 27 of the springs 18 are positioned immediately behind the ears 26 and encircle the forward ends of the U-bolts 23 while cups 28 also included upon the U-bolts 23 between the spring plates 24 and plates 25 have their side walls extending forwardly thereof and form an enclosure and ornamental design for the convolutions 27 of the springs 18.

It is thus to be noted from the foregoing description and accompanying drawings that this invention provides an exceedingly useful bumper capable of being used indefinitely owing to the resilient character of the supporting means therefor which will give an appreciable resistance without breaking, as is the occurrence of the rigidly secured bumpers now in use, and yet being limited as to its resilience in giving effect and providing a means of protecting the vehicle from being demolished by a direct force, thus eliminating the usual shock when encountering an object or colliding with another motor vehicle.

The invention is susceptible of various changes in its form, proportions and minor details of construction, and the right is herein reserved to make such changes as properly fall within the scope of the appended claims.

Having described our invention what is claimed is:—

1. A bumper for use upon motor vehicles comprising anchoring brackets arranged at appropriate points thereon, U-bolts supported upon the forward portion of the anchoring brackets, plates secured to the bumper at appropriate points in the length thereof, and springs having their respective end convolutions secured to the U-bolts and plates providing a combined universal joint and shock absorber for the bumper.

2. A bumper for use upon motor vehicles comprising anchoring brackets arranged at appropriate points upon the motor vehicle chassis, grooved plates secured to the forward portion of the anchoring brackets journaling the intermediate portion of the U-bolts thereupon, plates arranged at spaced intervals the length of the bumper and terminating in oppositely inwardly extending apertured ears for the reception of fastening elements therein, and springs having their respective end convolutions encircling the fastening means and U-bolts providing a combined universal joint and shock absorber for the bumper.

3. A bumper for use upon motor vehicles comprising anchoring brackets arranged upon the motor vehicle chassis, grooved plates arranged upon the forward portion of the anchoring brackets, U-bolts having their intermediate portions arranged within the channels of the plates and having their respective ends extending forwardly thereof, a plate having inwardly extending apertured ears upon the respective ends thereof receiving the corresponding ends of the U-bolts therein, plates arranged at spaced intervals in the length of the bumper and terminating at their ends in oppositely inwardly extending apertured ears, fastening means positioned within the apertured ears of the plates, and springs having their respective end convolutions encircling the fastening means and respective ends of the U-bolts providing a combined universal joint and shock absorber for the bumper.

4. A bumper for use upon motor vehicles comprising anchoring brackets arranged upon the motor vehicle chassis, grooved plates arranged upon the forward sides of the anchoring brackets, U-bolts having their intermediate portions positioned within the grooved portions of the grooved plates, and intermediately offset spring plates being positioned upon the U-bolts, a plate terminating in oppositely disposed apertured ears being received upon the U-bolts, plates arranged at spaced intervals in the length of the bumper and terminating in oppositely inwardly extending apertured ears for the reception of fastening elements therethrough, and springs having their opposite end convolutions encircling the fastening means and U-bolts beneath the apertured ears of the corresponding plates providing a combined universal joint and shock absorber for the bumper.

5. A bumper for use upon motor vehicles comprising anchoring brackets arranged upon the motor vehicle chassis, grooved plates being positioned upon the forward portions of the anchoring brackets, U-bolts having their intermediate portions positioned within the grooved portions of the plates and having their respective ends extending forwardly thereof, intermediately offset plates having their respective ends received upon the corresponding ends of the U-bolts, cup-shaped members arranged upon the forwardly extending ends of the U-bolts, plates terminating in inwardly and oppositely disposed apertured ears and received upon the forwardly extending ends of the U-bolts, plates arranged at spaced intervals in the length of the bumper and terminating at their ends in oppositely inwardly extending apertured ears, offset spring plates being arranged upon the inner sides of the plates and extending immediately behind the oppositely inwardly disposed apertured ears and receiving fastening elements therethrough from the plates and bumper, and springs having their respective end convolutions encircling the fastening means and U-bolts beneath the inwardly disposed apertured ears providing a combined universal joint and shock absorber for the bumper.

In testimony whereof we affix our signatures.

CYRILL BRIGNOLO.
THONY AMARI.
GIUSEPPE BRIGNOLO.